UNITED STATES PATENT OFFICE.

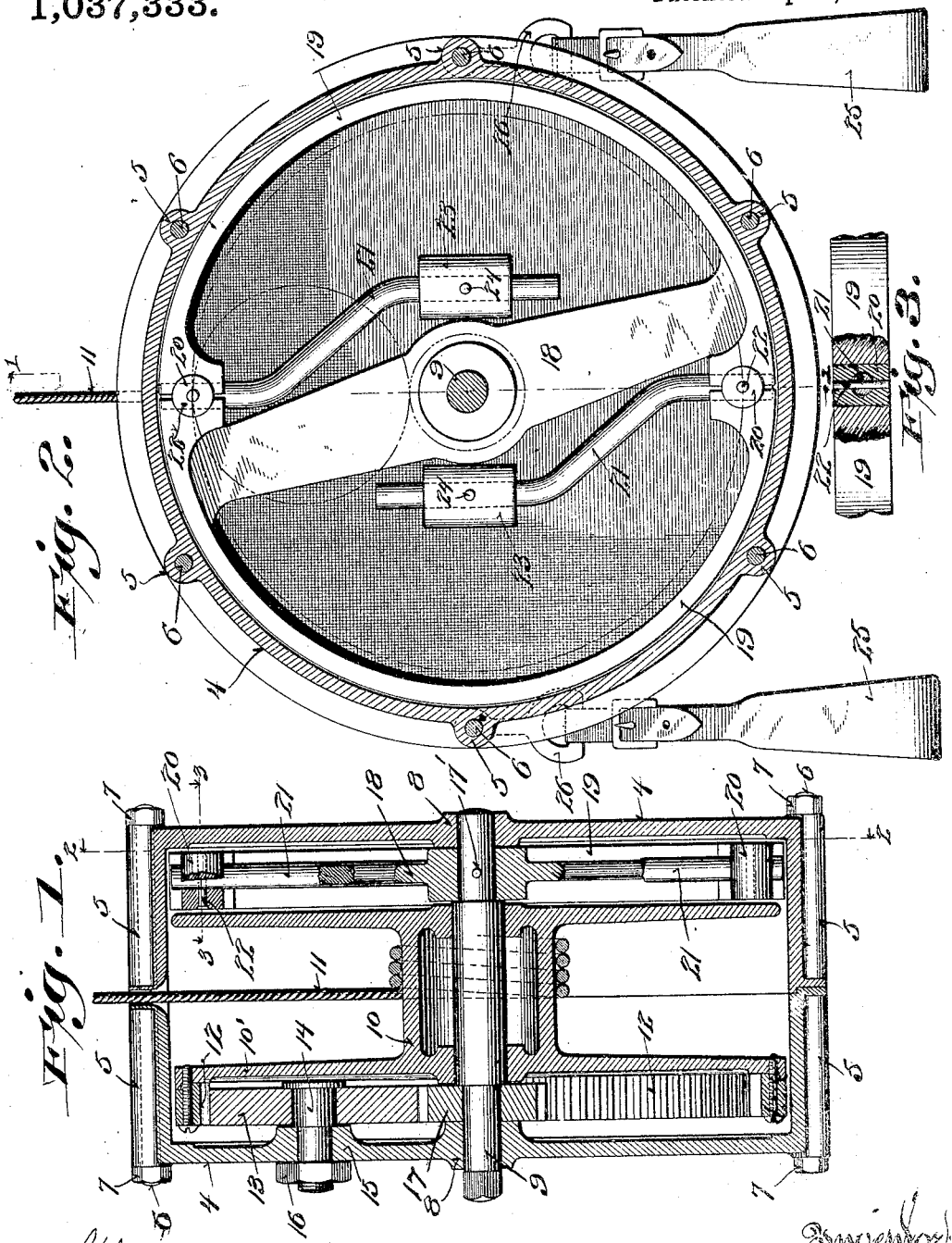
J. F. SCHEUER.
FIRE ESCAPE APPARATUS.
APPLICATION FILED MAY 29, 1911.
1,037,333.
Patented Sept. 3, 1912.

JOSEPH F. SCHEUER, OF TWO CREEKS, WISCONSIN.

FIRE-ESCAPE APPARATUS.

1,037,333.

Specification of Letters Patent. Patented Sept. 3, 1912.

Application filed May 29, 1911. Serial No. 630,045.

*To all whom it may concern:*

Be it known that I, JOSEPH F. SCHEUER, a citizen of the United States, and resident of the town of Two Creeks, in the county of Manitowoc and State of Wisconsin, have invented certain new and useful Improvements in Fire-Escape Apparatus; and I do hereby declare that the following is a full, clear, and exact description thereof.

My invention consists in what is herein particularly set forth with reference to the accompanying drawings and pointed out in the claim of this specification, its object being to provide simple, economical and efficient fire escape apparatus embodying a cable designed to be securely fastened at one end in a building and to unwind from a drum automatically controlled as to maximum speed by a governor-brake therewith in a casing to which an operator attaches himself by suitable means with which said casing is provided.

Figure 1 of the drawings represents a transverse section view of a fire-escape apparatus in accordance with my invention, the plane of the section being indicated by line 1—1 in the next described figure; Fig. 2, an elevation of the apparatus partly in section on the plane indicated by line 2—2 in Fig. 1, and Fig. 3, a partly sectional view of a fragment of said apparatus, the section being indicated by line 3—3 in said Fig. 1.

Referring by numerals to the drawings, 4 indicates each of a pair of sections that together constitute a circular casing, flanged rims of the sections being preferably in halving-joint union. At intervals of their circumference, the sections of the casing are provided with hollow registering transverse ribs 5 engaged by bolts 6, and nuts 7 are run on the ends of the bolts to hold said casing-sections in union.

The heads of the casing are centrally thickened and enlarged to provide bearings 8 for a shouldered spindle 9, and loose upon the middle enlarged portion of the spindle is a drum 10 to which one end of a cable 11 is made fast, said cable being engaged with an opening provided for the same in said casing. The opening is halved in the meeting rims of the casing-sections and beveled to prevent chafing of the cable. An outwardly extending end of the spindle is squared for the engagement of a detachable crank, not shown.

Bolted or otherwise rigidly secured to a head 10' of the drum is a ring 12 having inner spur-teeth that mesh with those of a spur-wheel 13 loose on a bearing-stud 14 with which the head of a casing-section is provided, the stud being shown as a headed and shouldered bolt that extends through a boss 15 of said casing-section, its outer screw-threaded end being engaged with a clamping-nut 16. The spur-wheel meshes with a spur-pinion 17 fast on a journal of the spindle 9, and thus the aforesaid drum is back-geared to said spindle. Made fast on the other journal of the spindle, by a key-pin 17', or otherwise, is the central hub of a cross-piece 18 cast or otherwise rigid with the sections 19 of a two-part friction ring, the meeting ends of the ring-sections being thickened and cross-notched to provide seats for diametrically opposite cylindrical blocks 20 and the outer ends of angularly bent rods 21 that extend through openings provided in the blocks, at right angles to the axes of the same, the rods being fastened to said blocks by pins 22 or other suitable means. The major portions of the rods 21 extend inward past the center of the cross-piece 18 connecting the sections of the two-part-ring, and weights 23 are fastened by pins 24, or other suitable means, to said rods adjacent to the inner ends of the same.

The two-part ring, cylindrical blocks and weighted arms, in the arrangement above specified, are elements of an automatic governor by which to control the speed of the drum aforesaid when the cable is unwinding therefrom, there being expansion of said ring against the opposing wall of a casing-section, so that the maximum of the speed aforesaid is the same under any load said cable will sustain, said expansion being due to the leverage of the weighted rods upon the ring-sections incidental to centrifugal force.

The casing is shown provided with hand-grips 25, attached to hangers 26 in suspension from casing-section-bolts, but other suitable means may be provided in connection with the casing for attaching the same to the person of an operator of the herein described apparatus, and it is intended to make the casing, drum, gearing and governor aforesaid of aluminum or other suitable light material to facilitate handling of the apparatus.

While it is preferable to fasten the outer end of the cable in a building to provide for a descent of said casing and other parts of the apparatus with an operator, it is also practical to have all of the apparatus other than the cable stationary in said building and provide for attachment of a person to the outer end of said cable.

I claim:

The combination in a fire-escape apparatus of a circular casing, a spindle for which the casing is provided with bearings, a cable-wound drum loose on the spindle and back-geared thereto, a two part friction-ring in said casing having its sections in opposition to the casing-wall, the opposing ends of these ring sections being provided with cross-notches, a cross-piece fast on said spindle and connecting the friction-ring sections, diametrically opposite cylindrical blocks and rods seated in said cross-notches, the rods being fastened in the blocks and extended inward past the center of the cross-piece, and weights fast on said rods adjacent to the inner ends of the same.

In testimony that I claim the foregoing I have hereunto set my hand at Two Creeks in the county of Manitowoc and State of Wisconsin in the presence of two witnesses.

JOSEPH F. SCHEUER.

Witnesses:
 OSCAR B. ALBERTS,
 JOHN HASHECK.